(12) United States Patent
Bash et al.

(10) Patent No.: US 7,901,131 B2
(45) Date of Patent: Mar. 8, 2011

(54) APPARATUS STATE DETERMINATION METHOD AND SYSTEM

(75) Inventors: Cullen E. Bash, Los Gatos, CA (US); Ratnesh Sharma, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 508 days.

(21) Appl. No.: 11/644,158

(22) Filed: Dec. 22, 2006

(65) Prior Publication Data

US 2008/0154534 A1 Jun. 26, 2008

(51) Int. Cl.
*G01N 25/20* (2006.01)
*G01R 31/00* (2006.01)

(52) U.S. Cl. ............ 374/4; 374/178; 324/500; 324/760; 702/130

(58) Field of Classification Search .............. 374/170, 374/178, 30–36, 4, 5, 137, 152, 165, 1, 135, 374/141, 147, 148, 100; 702/130–136, 99; 361/687; 324/500, 760, 765–769, 537
See application file for complete search history.

(56) References Cited

U.S. PATENT DOCUMENTS

| | | | | |
|---|---|---|---|---|
| 4,257,552 A * | 3/1981 | Farkas et al. | 236/1 R |
| 4,306,293 A * | 12/1981 | Marathe | 700/291 |
| 4,315,243 A * | 2/1982 | Calvert, Sr. | 340/449 |
| 4,504,156 A * | 3/1985 | Currie et al. | 374/45 |
| 5,623,594 A * | 4/1997 | Swamy | 714/1 |
| 5,956,663 A * | 9/1999 | Eryurek | 702/183 |
| 6,257,319 B1 * | 7/2001 | Kainuma et al. | 165/11.1 |
| 6,262,584 B1 * | 7/2001 | Kurosu et al. | 324/760 |
| 7,111,211 B1 * | 9/2006 | Co et al. | 714/718 |
| 7,249,718 B2 * | 7/2007 | Beitelmal et al. | 236/49.3 |
| 7,347,621 B2 * | 3/2008 | Sri-Jayantha et al. | 374/166 |
| 2002/0039280 A1 * | 4/2002 | O'Connor et al. | 361/690 |
| 2004/0129067 A1 * | 7/2004 | Mauro et al. | 73/118.1 |
| 2006/0117779 A1 * | 6/2006 | Liebenow | 62/259.2 |
| 2006/0144057 A1 * | 7/2006 | You et al. | 62/126 |
| 2007/0062673 A1 * | 3/2007 | Olesen | 165/80.4 |
| 2008/0043431 A1 * | 2/2008 | Marotta et al. | 361/689 |
| 2010/0134130 A1 * | 6/2010 | Lou et al. | 324/760 |

FOREIGN PATENT DOCUMENTS

JP 59116022 A * 7/1984
JP 01301499 A * 12/1989

* cited by examiner

*Primary Examiner* — Gail Verbitsky

(57) ABSTRACT

In a method for determining a state of an apparatus, detected temperatures are received from a plurality of sensors and are compared to at least one preset condition. The state of the apparatus is determined based upon the comparison.

12 Claims, 7 Drawing Sheets

APPARATUS STATE DETERMINATION METHOD AND SYSTEM

BACKGROUND

Air conditioning units are typically employed to cool heated air and to supply cooled air to the computer systems in data centers. In some data centers, sensors are positioned at various locations and provide information to the air conditioning units, which the air conditioning units use in distributing cooling resources. In these types of data centers, the air conditioning units attempt to cool the areas around the sensors from which they receive the information, regardless of the airflow conditions around the respective sensors.

However, some of the sensors are oftentimes positioned in locations of the data center that are not particularly useful, such as, areas containing no computer systems or airflow. In addition, when computer systems in a particular area are deactivated, stagnation areas often form at the front of the computer systems, which often result in incorrect temperature measurements as airflow is not being drawn into the computer systems. Conventional air conditioning units waste cooling resources to cool these stagnation areas, even though cooling at those areas is unnecessary since the computer systems are inactive. As another example, computer equipment manufacturers occasionally design their equipment, such as network switches, to output hot air in directions that are counter to the direction of airflow outputted from the computer systems. In this example, the hot air may be detected by a sensor and may cause overcooling of the computer systems located near or in the airflow path of that sensor.

One approach to solving these problems has been to manually adjust the states of some of the sensors such that the air conditioning units do not rely on the information received from those sensors. This approach, however, is time consuming and prone to human error.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are various methods and systems for determining the states of apparatuses, which include sensors and other electronic devices, such as, servers, computers, hard drives, switches, routers, etc. The systems and methods disclosed herein may be employed to analyze conditions detected throughout a data center to determine, for instance, which of the sensors contained in the data center are suitable to function as control sensors. In addition, the systems and methods disclosed herein may be employed to determine whether there are sensors and or other electronic devices that are not operating properly or are positioned in unfavorable fluid flow areas of the data center.

Figure 1:
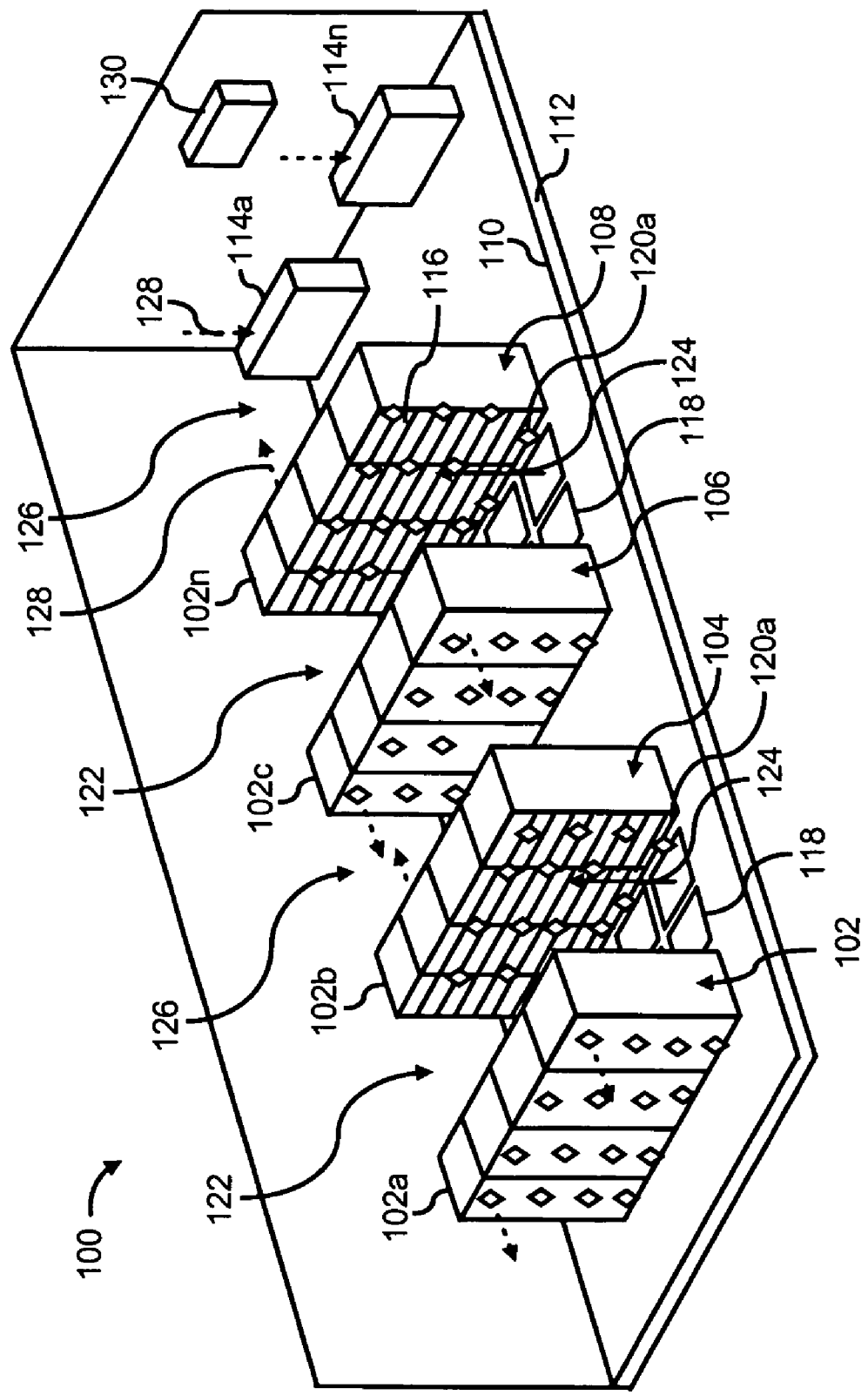
FIG. 1 shows a simplified perspective view of a data center which may employ various examples of a system for determining apparatus states in the data center, according to an embodiment of the invention.

With reference first to FIG. 1, there is shown a simplified perspective view of a section of a data center 100, which may employ various examples of a system for determining apparatus states in the data center 100 disclosed herein. The terms "data center" are generally meant to denote a room or other space where one or more components capable of generating heat may be situated. In this respect, the terms "data center" are not meant to limit embodiments of the invention to any specific type of room where data is communicated or processed, nor should it be construed that use of the terms "data center" limits the invention in any respect other than its definition herein above.

The data center 100 is depicted as having a plurality of racks 102a-102n, where "n" is an integer greater than one. The racks 102a-102n are generally configured to house electronic devices 116 capable of generating/dissipating heat, for instance, computers, servers, bladed servers, disk drives, displays, etc. The electronic devices 116 may be operated to perform various electronic functions, for instance, computing, switching, routing, displaying, and the like.

The racks 102a-102n are depicted as being positioned on a raised floor 110, which may function as a plenum for delivery of cooled fluid, such as, air, refrigerant, water, etc., from one or more fluid moving devices 114a-114n, where "n" is an integer equal to or greater than one. As shown in FIG. 1, when the fluid comprises a gas, such as air or a gaseous refrigerant, the fluid is delivered through vents 118 to the racks 102a-102n. In other instances, when the fluid comprises a liquid, such as water, a liquid refrigerant, a multi-state refrigerant, etc., the fluid may be delivered to the racks 102a-102n through a series of pipes (not shown).

The fluid moving devices 114a-114n may comprise widely available, conventional air conditioning (AC) units and may thus supply fluid flow to a space 112 beneath the raised floor 110, and in certain instances may cool heated fluid (indicated by the arrows 128). The fluid moving devices 114a-114n may comprise vapor-compression type air conditioning units, chiller type air conditioning units, etc. Examples of suitable fluid moving devices 114a-114n may be found in co-pending and commonly assigned U.S. patent application Ser. No. 10/853,529, filed on May 26, 2004, and entitled "Energy Efficient CRAC Unit Operation," the disclosure of which is hereby incorporated by reference in its entirety.

The fluid moving devices 114a-114n include respective actuators (not shown) configured to manipulate characteristics of the cooled fluid flow supplied to the racks 102a-102n, such as fluid flow temperature and supply rate. As such, the actuators include, for instance, devices for manipulating fluid flow temperature, such as chillers, heat exchangers, etc., and devices for manipulating the supply flow rates, such as variable frequency devices, blowers, etc., of the cooled fluid.

The cooled fluid, indicated by the arrows 124, is delivered from the space 112 to the racks 102a-102n through fluid delivery devices 118 located between some or all of the racks 102a-102n. The fluid delivery devices 118 may comprise, for instance, ventilation tiles, variable fluid flow volume devices, etc., and are shown as being located between rows 104a and 104b and 104c and 104d. Although the fluid delivery devices 118 and the space 112 have been depicted as being located on a floor of the data center 100, it should be understood that the fluid delivery devices 118 and the space 112 may be positioned on the ceiling or a wall of the data center 100 without departing from a scope of the invention.

Also shown in FIG. 1 are a plurality of sensors 120a-120n, where "n" is an integer greater than one, configured to detect one or more conditions at their respective locations. In one regard, the sensors 120a-120n may comprise temperature sensors, such as, thermocouples, thermistors, etc. The sensors 120a-120n are represented as diamonds to distinguish them from other elements depicted in FIG. 1. In addition, the sensors 120a-120n are depicted as being positioned to detect the temperatures at various locations near the inlets and the outlets of the racks 102a-102n. Although not shown, the sensors 120a-120n may comprise sensors associated with or integrally manufactured with one or more of the electronic devices 116. Alternatively, however, the sensors 120a-120n may comprise separately installed sensors 120a-120n.

The sensors 120a-120n may be networked with a computing device 130. As described in greater detail below, the computing device 130 may employ one or more of the sensors 120a-120n as "control sensors". More particularly, the computing device 130 may be configured to control the actuators of the fluid moving devices 114a-114n based upon the conditions detected by one or more of the "control sensors". In one regard, the "control sensors" may be defined as those sensors 120a-120n that the computing device 130 relies upon to make fluid moving device 114a-114n control decisions.

The computing device 130 may rely upon the conditions detected by the control sensors over the other sensors 120a-120n because the control sensors may, for instance, provide a relatively accurate indication of the actual conditions around the control sensors. A more detailed description of control sensors is provided in commonly assigned and co-pending U.S. patent application Ser. No. 10/078,087, entitled "Commissioning of Sensors", filed on Mar. 11, 2005, the disclosure of which is hereby incorporated by reference in its entirety.

Various examples of manners in which selected ones of the sensors 120a-120n may be chosen as the control sensors are also discussed in greater detail herein below. In one respect, the control sensors may comprise those sensors 120a-120n that meet predefined criteria and thus have appropriate states.

In addition to determining which sensors 120a-120n are considered to be control sensors, various manners in which one or more states of the sensors 120a-120n are determined are also discussed below. More particularly, for instance, various examples are disclosed herein of manners in which the measurements obtained by the sensors 120a-120n may be analyzed to determine their states. Additionally, various examples are disclosed herein of manners in which the measurements obtained by the sensors 120a-120n may be analyzed to determine the states of various electronic devices 116 associated with the sensors 120a-120n.

Figure 2A:
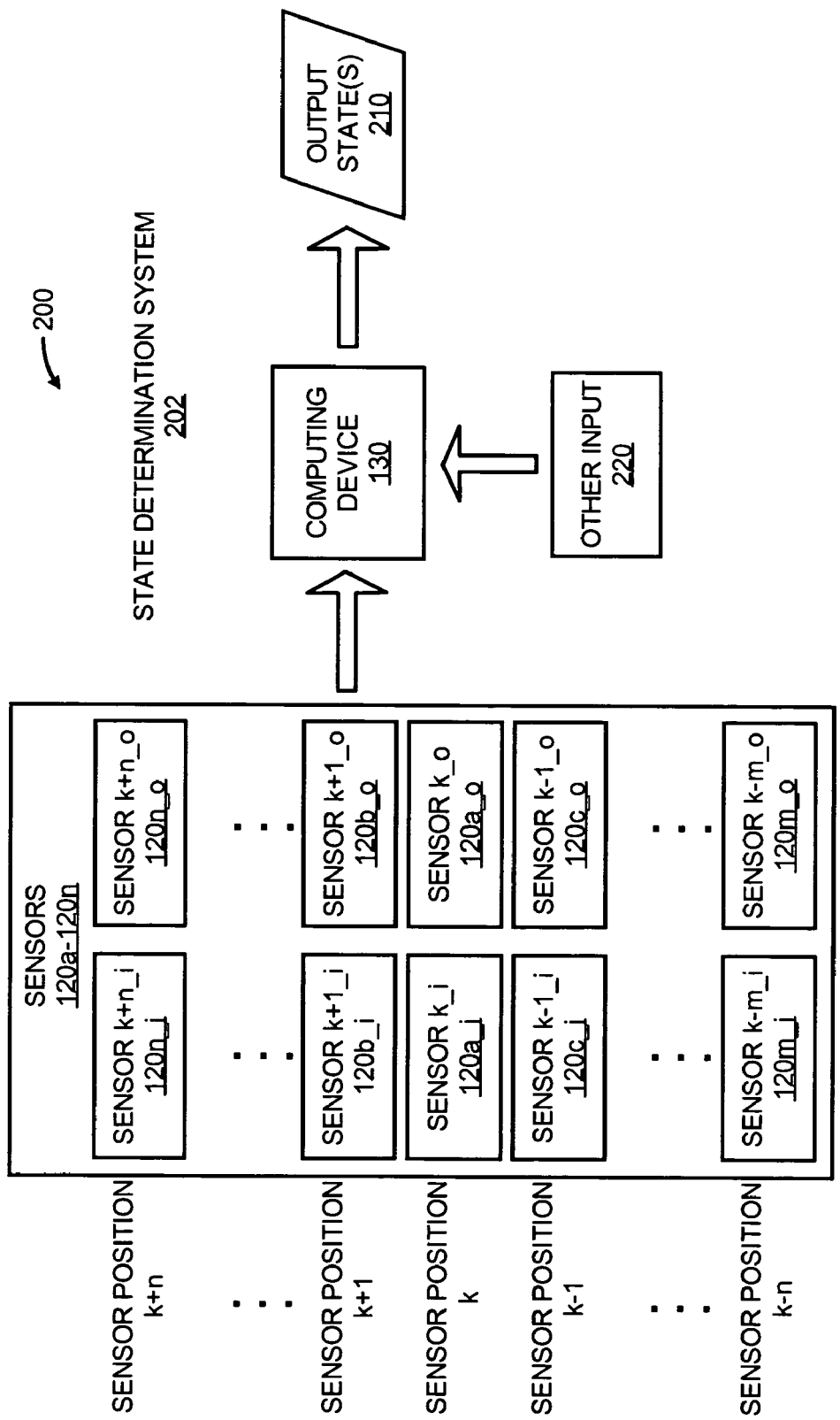
FIG. 2A is a data flow path of a state determination system, according to an embodiment of the invention.

FIG. 2A is a data flow path 200 of a state determination system 202, according to an example. It should be understood that the following description of the data flow path 200 is but one manner of a variety of different manners in which such a state determination system 202 may operate. In addition, it should be understood that the state determination system 202 may include additional components and that some of the components described herein may be removed and/or modified without departing from the scope of the state determination system 202.

As shown, the state determination system 202 includes the computing device 130 depicted in FIG. 1. As described herein above, the computing device 130 is configured to perform various functions in the data center 100. In this regard, the computing device 130 may comprise, for instance, a computer system, a server, etc. In addition, the computing device 130 may comprise a microprocessor, a micro-computing device, an application specific integrated circuit (ASIC), and the like, configured to perform various processing functions. In addition, or alternatively, the computing device 130 may comprise software operating in any of a number of computing devices, including on one or more of the electronic devices 116, the fluid moving devices 114a-114n, etc.

As further shown in FIG. 2A, the state determination system 202 includes the plurality of sensors 120a-120n. The sensors 120a-120n are depicted as being in vertical arrangement (k−n to k+n) with respect to each other, which may be similar to the configuration of a plurality of sensors 120a-120n positioned to detect conditions with respect to the electronic devices 116 housed in a rack 102a. The sensors 120a-120n are also depicted in pairs, such that, a plurality of inlet (i) and outlet (o) sensors 120a-120n are positioned to respectively detect conditions at the inlets and outlets of the plurality of electronic devices 116 housed in the rack 102a.

Although not shown, the sensors 120a-120n may also be associated with the electronic devices 116. In other words, a pair of sensors 120a_i and 120a_o may be considered as being associated with an electronic device 116, if the sensors 120a_i and 120a_o are positioned to detect the inlet and outlet conditions of that electronic device 116 or within respective vicinities of the inlet and outlet of that electronic device 116.

In a first example, the computing device 130 may analyze the condition information received from the sensors 120a-120n and may output the states 210 of either or both of the sensors 120a-120n and the electronic devices 116 to which the sensors 120a-120n are associated. The output states 210 of the sensors 120a-120n may include, for instance, that a sensor 120a is not operational, that a sensor 120a is off calibration, that a sensor 120a is detecting re-circulated fluid conditions, etc. The output states 210 of the electronic devices 116 may include, for instance, that an electronic device 116 is not operational, that an electronic device 116 is lightly loaded, that an electronic device 116 is operating in a reverse fluid flow path, etc. In addition, the computing device 130 may determine which of the sensors 120a-120n are suitable to function as control sensors.

In a second example, the computing device 130 may receive other input 220 from other sources in the data center 100. The other input 220 may include, for instance, the amount of power consumed by the electronic devices 116, the workload placed on the electronic devices 116, etc. In this example, the computing device 130 may employ the other input 220 in determining the states 210 of either or both of the sensors 120a-120n and the electronic devices 116.

Figure 2B:
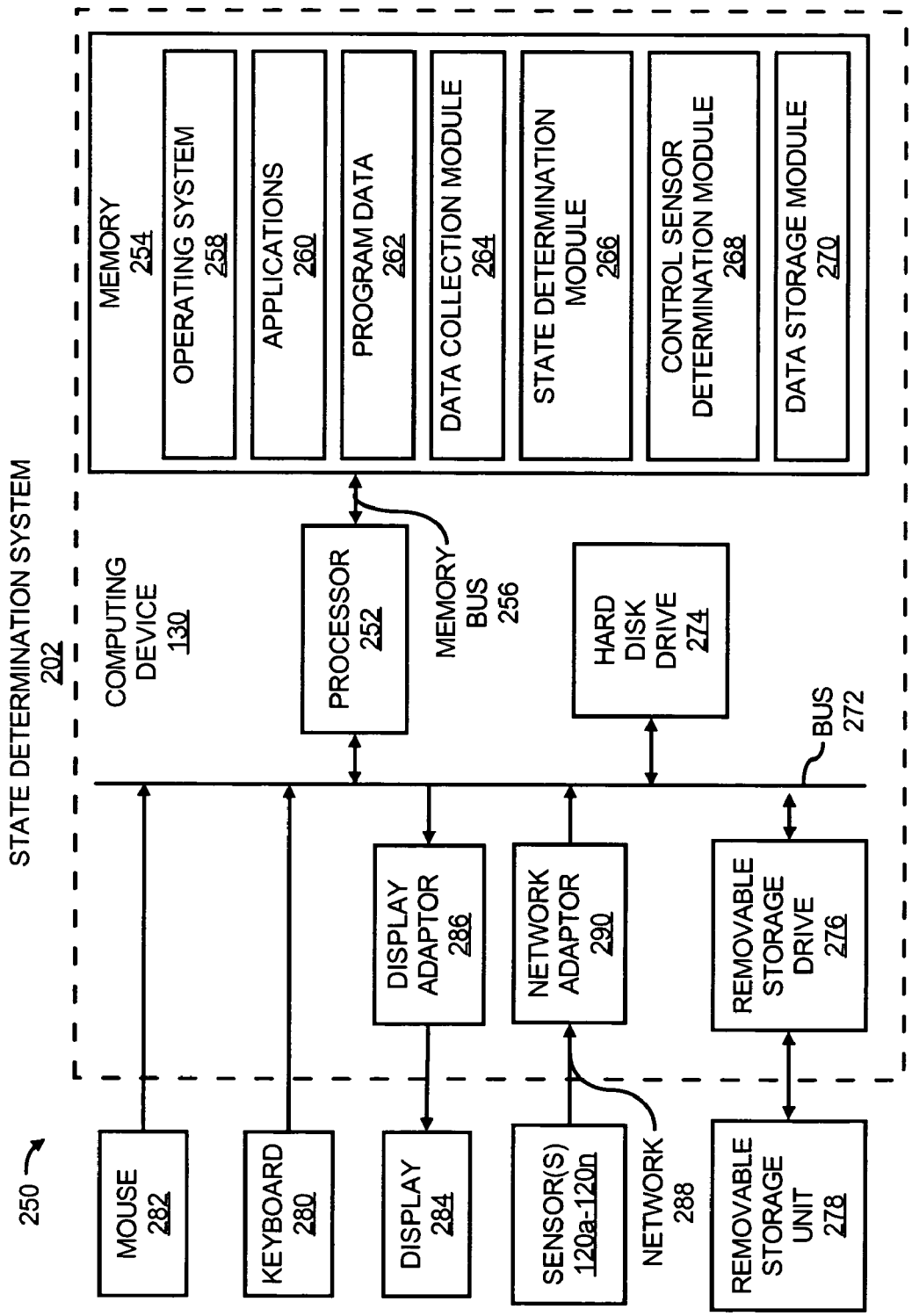
FIG. 2B is a block diagram 250 of the state determination system depicted in FIG. 2A, according to an embodiment of the invention.

With reference now to FIG. 2B, there is shown a block diagram 250 of the state determination system 202, according to an example. It should be understood that the following description of the block diagram 250 is but one manner of a variety of different manners in which such a state determination system 202 may be configured. In addition, it should be understood that the state determination system 202 may include additional components and that some of the components described herein may be removed and/or modified without departing from the scope of the state determination system 202.

As shown in FIG. 2B, various components of the computing device 130 are depicted in greater detail. Initially, the computing device 130 is depicted as including a processor 252 connected to a memory 254 through a memory bus 256. However, in various instances, the memory 254 may form part of the processor 252 without departing from a scope of the state determination system 202. The processor 252 may be configured to perform various functions in the computing device 130, and may include a microprocessor, a micro-computing device, an application specific integrated circuit (ASIC), and the like, configured to perform various processing functions.

Generally speaking, the memory 254 may be configured to provide storage of software, algorithms, and the like, that provide the functionality of the processor 252. By way of example, the memory 254 may store an operating system 258, application programs 260, program data 262, and the like. In this regard, the memory 254 may be implemented as a combination of volatile and non-volatile memory, such as DRAM, EEPROM, MRAM, flash memory, and the like. In addition, or alternatively, the memory 254 may comprise a device configured to read from and write to a removable media, such as, a floppy disk, a CD-ROM, a DVD-ROM, or other optical or magnetic media.

The memory 254 is also depicted as including a data collection module 264, a state determination module 266, a control sensor determination module 268, and a data storage module 270. The processor 252 may invoke or otherwise implement the modules 264-270 to determine the states of either or both of the sensors 120a-120n and the electronic devices 116 to which the sensors 120a-120n are associated. In one respect, the processor 252 may determine these states to determine which of the sensors 120a-120n are suitable for use as control sensors.

In determining the respective states, the processor 252 may initially invoke the data collection module 264 to collect temperature measurements from the sensors 120a-120n. In addition, the processor 252 may invoke the state determination module 266 to determine the states of either or both of the sensors 120a-120n and the electronic devices 116. Various manners in which the state determination module 266 may be invoked to determine the states are described in greater detail herein below with respect to FIGS. 3 and 4A-4C.

The processor 252 may also invoke the control sensor determination module 268 to determine which of the sensors 120a-120n have states that are suitable for the sensors 120a-120n to be used as control sensors.

The processor 252 may further implement the data storage module 270 to store the data collected by the data collection module 264. For instance, the data storage module 270 may store the data in a data storage location in the memory 254. In addition, the processor 252 may implement the data storage module 270 to store the states of the sensors 120a-120n and/or the electronic devices 116.

The data storage module 270 may also store the identities and the locations of the sensors 120a-120n. The data storage module 270 may further store associations between the sensors 120a-120n and the electronic devices 116, which may, for instance, be based upon the respective locations of the sensors 120a-120n and the electronic devices 116. This information may manually be stored in the data storage module 270, for instance, during a commissioning process of the data center 100. In addition, the processor 252 may use this information to determine the states of the sensors 120a-120n and/or the electronic devices 116, as described in greater detail herein below.

The data storage module 270 may store the states of the sensors 120a-120n and/or the electronic devices 116, the locations of the sensors 120a-120n, which of the sensors 120a-120n comprise control sensors, the correlations between the sensors 120a-120n and the electronic devices 116, etc., in a variety of different manners. For instance, the data storage module 270 may store this information in the form of a look-up table. In addition, or alternatively, the data storage module 270 may store this information in the form of a map that may be employed to visualize the positions of the sensors 120a-120n, the electronic devices 116, the control sensors, and their respective states.

Instructions from the processor 252 may be transmitted over a communication bus 272 that operates to couple the various components of the state determination system 202. The computing device 130 is also depicted as including a a secondary memory, which includes a hard disk drive 274 and a removable storage drive 276, representing a floppy diskette drive, a magnetic tape drive, a compact disk drive, etc., which may be employed to communicate information through a removable storage unit 278.

The computing device 130 is also depicted as interfacing with user input and output devices, including a keyboard 280, a mouse 282, and a display 284. A display adaptor 286 may interface with the communication bus 272 and the display 284 and may receive display data from the processor 252 and convert the display data into display commands for the display 284. In addition, the processor 252 may communicate over a network 288, for instance, the Internet, LAN, etc., through a network adaptor 290. As shown, the sensors 120a-120n are configured to transmit collected data over the network 288 to the computing device 130 for storage and processing. The network 288 may comprise a wired or a wireless network and the sensors 120a-120n may thus be configured to communicate with the computing device 130 through any reasonably suitable wired or wireless connection.

According to an example where the computing device 130 is configured to control operations of the fluid moving devices 114a-114n, the computing device 130 may transmit instructions over the network 288 to the fluid moving devices 114a-114n to vary operations of the fluid moving devices 114a-114n. Thus, for instance, the computing device 130 may transmit instructions to the fluid moving devices 114a-114n based upon the conditions detected by the sensors 120a-120n determined to qualify as control sensors.

Figure 3:
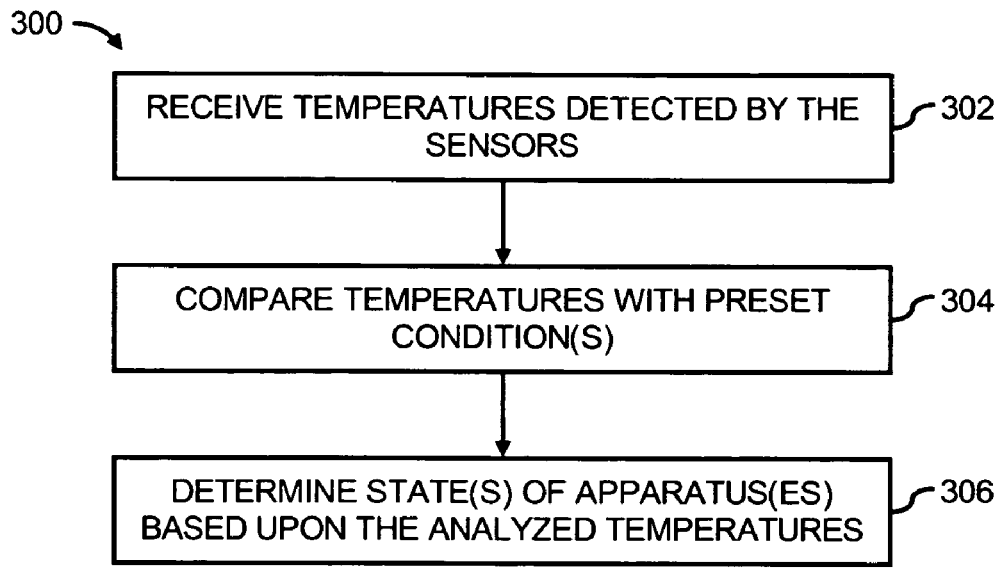
FIG. 3 illustrates a flow diagram of a method for determining a state of an apparatus, according to an embodiment of the invention.

Turning now to FIG. 3, there is shown a flow diagram of a method 300 for determining a state of an apparatus, according to an example. It should be apparent to those of ordinary skill in the art that the method 300 represents a generalized illustration and that other steps may be added or existing steps may be removed, modified or rearranged without departing from a scope of the method 300.

The description of the method 300 is made with reference to the flow diagram 200 depicted in FIG. 2A and the block diagram 250 illustrated in FIG. 2B, and thus makes reference to the elements cited therein. It should, however, be understood that the method 300 is not limited to the elements set forth in the flow diagram 200 and the block diagram 250. Instead, it should be understood that the method 300 may be practiced by a system having a different configuration than that set forth in the flow diagram 200 and the block diagram 250.

In the method 300, the processor 252 may receive temperatures detected by a plurality of sensors 120a-120n, as indicated at step 302. At step 304, the processor 252 may compare the temperatures with at least one preset condition. At step 306, the processor 252 may determine the respective states of one or more apparatuses based upon the comparison. Various manners in which the processor 252 may determine the states are discussed in greater detail herein below with respect to FIGS. 4A-4C.

Figure 4B:
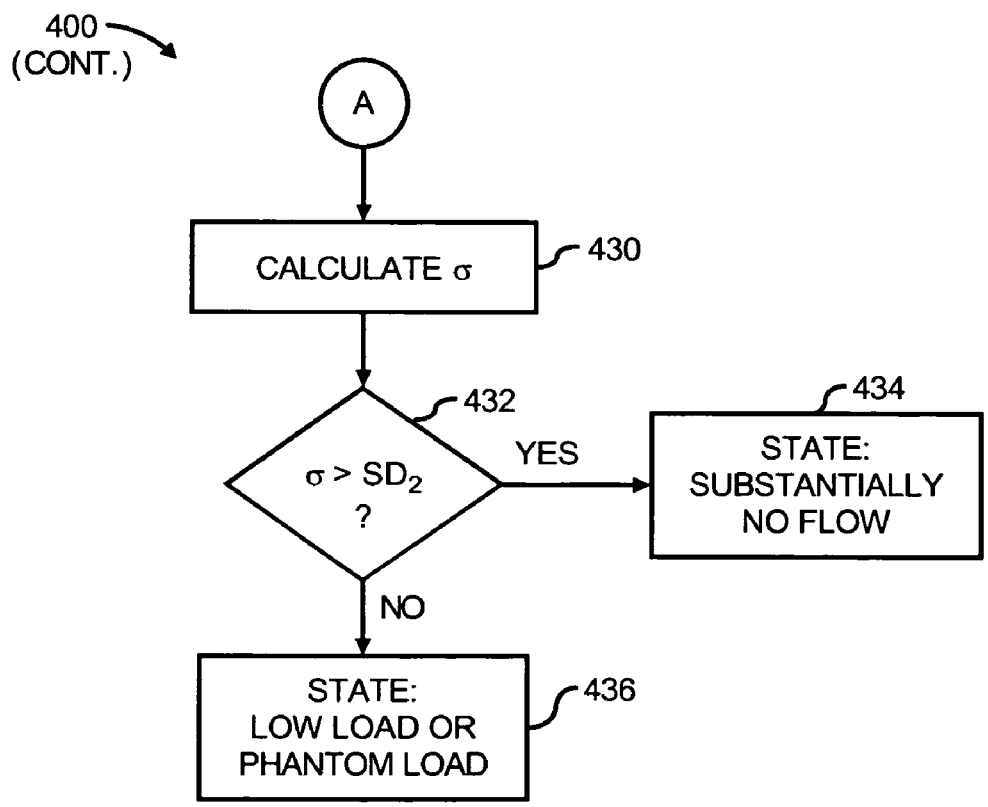
FIG. 4A-4C, collectively, depict a flow diagram of a method for determining a state of an apparatus, according to another embodiment of the invention.
Figure 4A:
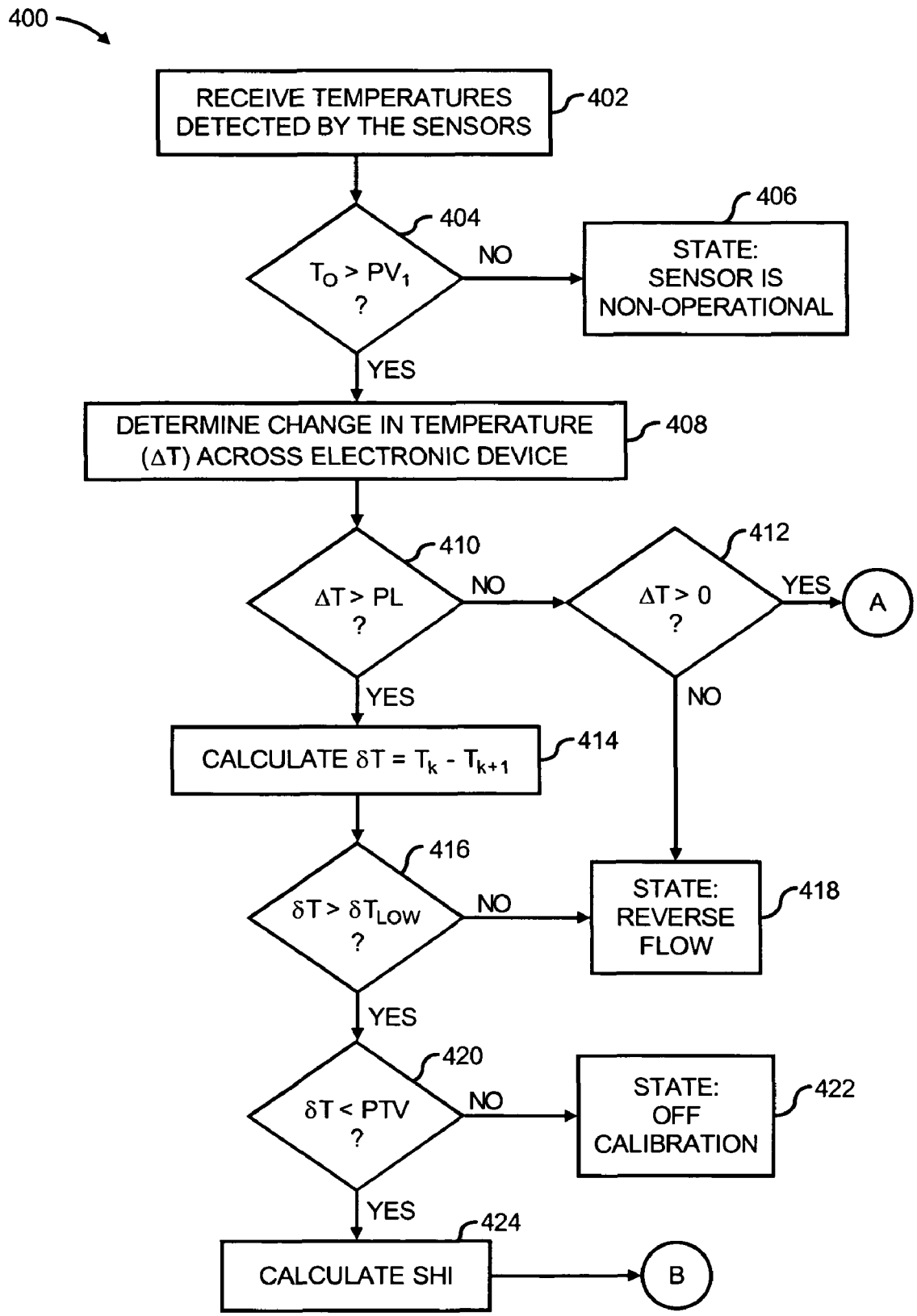
Figure 4C:
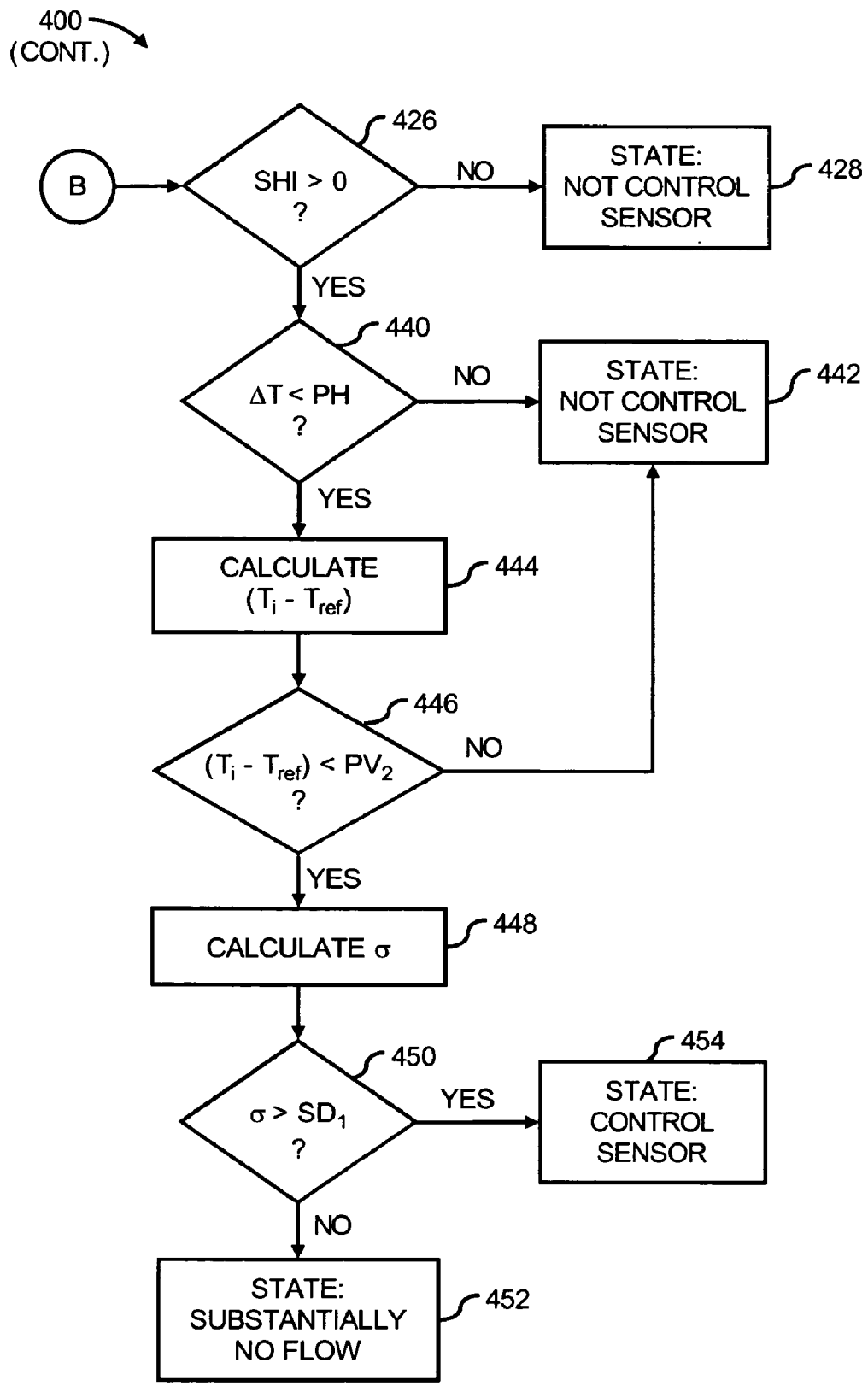

FIGS. 4A-4C, collectively, depict a flow diagram of a method 400 of determining a state of an apparatus, according to another example. It should be apparent to those of ordinary skill in the art that the method 400 represents a generalized illustration and that other steps may be added or existing steps may be removed, modified or rearranged without departing from a scope of the method 400.

The description of the method 400 is made with reference to the flow diagram 200 depicted in FIG. 2A and the block diagram 250 illustrated in FIG. 2B, and thus makes reference to the elements cited therein. It should, however, be understood that the method 300 is not limited to the elements set forth in the flow diagram 200 and the block diagram 250. Instead, it should be understood that the method 300 may be practiced by a system having a different configuration than that set forth in the flow diagram 200 and the block diagram 250.

Generally speaking, the processor 252 may implement the method 400 to determine the state of an apparatus, where the apparatus includes a sensor 120a or an electronic device 116. When the apparatus comprises a sensor 120a, the states 210 of the sensor 120a may include, for instance, that the sensor 120a is not operational, that the sensor 120a is off calibration, that the sensor 120a is detecting re-circulated fluid conditions, that the sensor 120a is suitable for use as a control sensor, that the sensor 120a is not suitable for use as a control sensor, etc. When the apparatus comprises an electronic device 116, the states 210 of the electronic device 116 may include, for instance, that the electronic device 116 is not operational, that the electronic device 116 is lightly loaded, that the electronic device 116 is operating in a reverse fluid flow path, etc.

Although reference is made to a single outlet sensor 120a_o, a single inlet sensor 120_i associated with the outlet sensor 120a_o, and an electronic device 116 positioned in the fluid flow path of these sensors 120a_o and 120a_i, it should readily be understood that the principles discussed herein to those apparatuses are applicable to the remaining sensors 120b-120n and electronic devices 116.

In the method 400, the processor 252 may receive temperatures detected by a plurality of sensors 120a-120n, as indicated at step 402. In addition, the processor 252 may invoke or implement the data storage module 270 to store the received temperatures. The processor 252 may further store correlations between the identities of the sensors 120a-120n and the detected temperatures received from the sensors 120a-120n. In one respect, therefore, the processor 252 may determine correlations between the temperature measurements from the outlet sensors and their associated inlet sensors. In addition, the processor 252 may determine associations between the electronic devices 116 and the correlated inlet and outlet sensors.

At step 404, for at least one of the outlet sensors 120a_o-120n_o, the processor 252 may compare the detected temperature ($T_o$) of the outlet sensor 120a_o with a first predetermined value ($PV_1$). Generally speaking, the processor 252 may perform step 404 to determine whether the outlet sensor 120a_o is operational. In this regard, the first predetermined value ($PV_1$) may comprise any reasonably suitable value that indicates whether the outlet sensor 120a_o is operational. By way of example, the first predetermined value ($PV_1$) may comprise a null value. Thus, for instance, if the detected temperature ($T_o$) of the outlet sensor 120a_o is equal to or less than the null value, the processor 252 may determine that the outlet sensor 120a_o is non-operational, as indicated at step 406.

If, however, the detected temperature ($T_o$) of the outlet sensor 120a_o exceeds the first predetermined value ($PV_1$), the processor 252 may determine that the outlet sensor 120a_o is operational. In addition, at step 408, the processor 252 may determine a change in temperature ($\Delta T$) across an electronic device 116. More particularly, the processor 252 may determine the difference in temperatures detected by the outlet sensor 120a_o ($T_o$) and an associated inlet sensor 120a_i ($T_i$). An inlet sensor 120a_i may be considered as being associated with an outlet sensor 120a_o if they are in the fluid flow path across the same electronic device 116. Thus, for instance, the outlet sensor 120a_o may be configured to detect the temperature of fluid flow exhausted from the electronic device 116 and the associated inlet sensor 120a_i may be configured to detect the temperature of fluid flow entering into the electronic device 116.

At step 410, the processor 252 may compare the change in temperature ($\Delta T$) with a predetermined low temperature value (PL). The predetermined low temperature value (PL) may be based upon the range of temperature differences found among the outlet sensors 120a_o-120n_o and their associated inlet sensors 120a_i-120n_i. The predetermined low temperature value (PL) may thus comprise the lowest temperature difference within the range of temperature differences, or a temperature difference within a predetermined level from the lowest temperature difference. By way of example, the predetermined low temperature value (PL) may be equal to 2 degrees Celsius.

If the change in temperature ($\Delta T$) falls below the predetermined low temperature value (PL) at step 410, the processor 252 may determine whether the change in temperature ($\Delta T$) exceeds a null value, as indicated at step 412. If the change in temperature ($\Delta T$) exceeds the null value, the processor 252 may calculate a standard deviation ($\sigma$) of the temperatures detected by a plurality of outlet sensors 120a_o-120n_o positioned at different heights with respect to each other, as indicated at step 430. The plurality of outlet sensors 120a_o-120n_o may, for instance, comprise those outlet sensors 120a_o-120n_o positioned on a single rack 102a.

At step 432, the processor 252 may compare the calculated standard deviation ($\sigma$) with a second predetermined standard deviation ($SD_2$). The second predetermined standard deviation ($SD_2$) may be based set according to the level of uncertainties in the measurements and analysis of the measurements obtained by the sensors 120a-120n, the inaccuracies of the sensors 120a-120n, variations in sensor 120a-120n positions, etc. By way of example, the second predetermined standard deviation ($SD_2$) may be equal to 0.5. The second predetermined standard deviation (SD2) may indicate a reverse gradient, for instance, if the temperatures are decreasing as the height is increased for a rack 102a. This occurs because, typically, for racks 102a-102n that receive cooling fluid from a raised floor, the lowest sensor 120m_i should have the lowest temperature and the highest sensor 120n_i should have the highest temperature.

If the calculated standard deviation ($\sigma$) exceeds the second predetermined standard deviation ($SD_2$), the processor 252 may determine that the electronic device 116 is in a state where there is substantially no fluid flow through the electronic device 116, as indicated at step 434. The determination at step 434 may be an indication that the electronic device 116 is in a deactivated state or is otherwise not in an operating condition. If, however, the calculated standard deviation ($\sigma$) falls below the second predetermined standard deviation ($SD_2$), the processor 252 may determine that the electronic device 116 is in a state where the electronic device 116 contains a relatively low load or a phantom load, as indicated at step 436. The phantom load may include, for instance, a perceived load on the electronic device 116, which may be caused by recirculation of heated fluid through the electronic device 116.

The processor 252 may further distinguish the state of the electronic device 116 between the low load and the phantom load condition based upon information received from another input 220, which may include, for instance, input regarding the amount of power consumed by the electronic device 116, the workload placed on the electronic device, etc. The processor 252 may use the information from the other input 220 to determine whether a workload has been placed on the electronic device 116. Thus, if a workload has been placed on the electronic device 116, the processor 252 may determine that the electronic device 116 has a low load, otherwise, the processor 252 may determine that the electronic device 116 has a phantom load.

With reference back to step 410, if the change in temperature ($\Delta T$) exceeds the predetermined low temperature value (PL), the processor 252 may calculate the difference in temperature ($\delta T$) between the associated inlet sensor 120a_i ($T_k$) and an inlet sensor 120b_i ($T_{k+1}$) located at a higher level than the associated inlet sensor 120a_i, as indicated at step 414. In addition, at step 416, the processor 252 may compare the difference in temperature ($\delta T$) with a predetermined low temperature difference ($\delta T_{low}$). The predetermined low temperature difference ($\delta T_{low}$) may be set based upon a number of various factors. These factors may include, for instance, the accuracy of the sensors 120a-120n, the rates at which fluid flow is supplied from the vent tiles 118, etc. By way of example, if the sensors 120a-120n have a 0.5 degree of accuracy, the predetermined low temperature difference ($\delta T_{low}$) may be equal to 1 degree Celsius, to thereby provide a sufficient margin outside of the noise region of the sensors 120a-120n.

If the difference in temperature ($\delta T$) falls below the predetermined low temperature difference ($\delta T_{low}$), or if, at step 412, the change in temperature ($\Delta T$) falls below the null value, the processor 252 may determine that the state of the electronic device 116 is that the electronic device 116 is operating in a reverse fluid flow, as indicated at step 418.

If, however, the difference in temperature ($\delta T$) exceeds the predetermined low temperature difference ($\delta T_{low}$), the processor 252 may determine whether the difference in temperature ($\delta T$) falls below a predetermined temperature variance (PTV), as indicated at step 420. The predetermined temperature variance (PTV) may be set according to a number of factors, including, desired tolerance levels, the accuracies of the sensors 120a-120n, etc. By way of example, the predetermined temperature variance (PTV) may be set according to a variance values that exceed commonly detected temperature differences. Thus, for instance, the predetermined temperature variance (PTV) may be equal to around 4 degrees C., in one example.

If the difference in temperature ($\delta T$) exceeds the predetermined temperature variance (PTV), the processor 252 may determine that the state of the associated inlet sensor 120a_i is off calibration, as indicated at step 422. In other words, for instance, the processor 252 may determine that the associated inlet sensor 120a_i may not have been properly calibrated.

If, however, the difference in temperature ($\delta T$) falls below the predetermined temperature variance (PTV), the processor 252 may calculate a supply heat index (SHI) in the vicinity of the outlet sensor 120a_o and the associated inlet sensor 120a_i, as indicated at step 424. The processor 252 may calculate the supply heat index (SHI) through the following equation:

$$SHI = \frac{T_i - T_{ref}}{T_o - T_{ref}}. \quad \text{Equation (1)}$$

In Equation (1), $T_i$ represents the temperature detected by the inlet sensor 120a_i, $T_o$ represents the temperature detected by the outlet sensor 120a_o, and $T_{ref}$ represents the temperature of fluid flow supplied to the inlet sensor 120a_i. A more detailed description of SHI is provided in commonly assigned U.S. patent application Ser. No. 7,051,946, entitled "Air Recirculation Index", the disclosure of which is hereby incorporated by reference in its entirety. As discussed in that patent, SHI is a scalable index of performance that may quantify the amount of re-circulation occurring at various locations.

Figure 5:
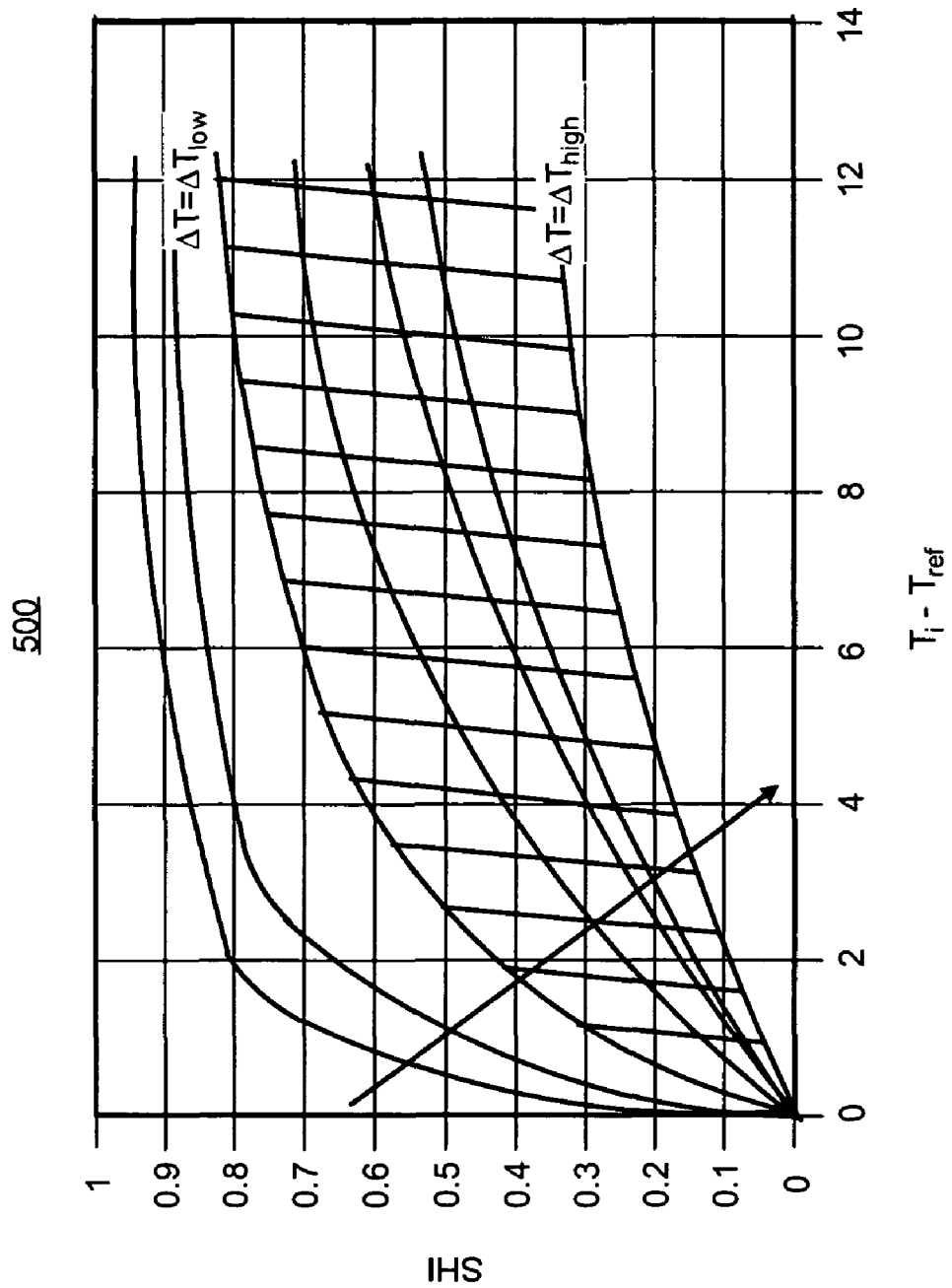
FIG. 5 illustrates a graph depicting an example of a relationship between the supply heat index and a difference between the inlet temperature and a reference temperature for a data center, according to an embodiment of the invention.

In addition, FIG. 5 depicts a graph 500 depicting an example of a relationship between a supply heat index (SHI) and a difference between the inlet temperature and a reference temperature over a normal operating range of sensors between a low temperature ($\Delta T_{low}$) and a high temperature ($\Delta T_{high}$). If the SHI lies within a bounded region as shown by the hashed section in FIG. 5, the states of the sensor 120a-120n and the electronic devices 116 are considered to be relatively normal.

At step 426, and as shown in FIG. 4C, the processor 252 may determine whether the SHI exceeds a null value. If the SHI falls below the null value, the processor 252 may determine that the associated inlet sensor 120a_i is not suitable for use as a control sensor, as indicated at step 428. In other words, when the SHI is negative, there is a relatively high probability that the sensor 120a_i hardware is faulty, and thus, the measurements obtained by the sensor 120a_i are inaccurate.

If, however, at step 426, the processor 252 determines that the SHI is greater than the null value, the processor may compare the change in temperature ($\Delta T$) calculated at step 408 with a predetermined high temperature value (PH), as indicated at step 440. The predetermined high temperature value (PH) may be based upon the range of temperature differences found among the outlet sensors 120a_o-120n_o and their associated inlet sensors 120a_i-120n_i. The predetermined high temperature value (PH) may thus comprise the highest temperature difference within the range of temperature differences, or a temperature difference within a predetermined level from the highest temperature difference. By way of example, the predetermined high temperature value (PH) may be equal to 20 degrees Celsius.

If the processor 252 determines that the change in temperature ($\Delta T$) exceeds the predetermined high temperature value (PH), the processor 252 may determine that the associated inlet sensor 120a_i is not suitable for use as a control sensor, as indicated at step 442. If, however, the processor 252 determines that the change in temperature ($\Delta T$) exceeds the predetermined high temperature value (PH), the processor 252 may calculate a difference between the temperature ($T_i$-$T_{ref}$) detected by the associated inlet sensor 120a_i and the reference temperature used to calculate SHI, as indicated at step 444.

At step 446, the processor 252 may compare the difference in temperature ($T_i$-$T_{ref}$) with a second predetermined value ($PV_2$). The second predetermined value ($PV_2$) may be based upon specified temperature changes across electronic devices 116, which may be set by the electronic device 116 manufacturers. By way of example, the second predetermined value ($PV_2$) may be set to equal 12 degrees Celsius.

If the processor 252 determines that the difference in temperature ($T_i$-$T_{ref}$) exceeds the second predetermined value ($PV_2$), the processor 252 may determine that the associated inlet sensor 120a_i is not suitable for use as a control sensor, as indicated at step 442. If, however, the processor 252 determines that the difference in temperature ($T_i$-$T_{ref}$) falls below the second predetermined value ($PV_2$), the processor 252 may calculate a standard deviation ($\sigma$) of the temperatures detected by a plurality of outlet sensors 120a_o-120n_o positioned at different heights with respect to each other, as indicated at step 448. The plurality of outlet sensors 120a_o-120n_o may, for instance, comprise those outlet sensors 120a_o-120n_o positioned on a single rack 102a.

At step 450, the processor 252 may compare the calculated standard deviation ($\sigma$) with a first predetermined standard deviation ($SD_1$). The first predetermined standard deviation ($SD_1$) may be based set according to the level of uncertainties in the measurements and analysis of the measurements obtained by the sensors 120a-120n, the inaccuracies of the sensors 120a-120n, variations in sensor 120a-120n positions, etc. By way of example, the first predetermined standard deviation ($SD_2$) may be equal to 0.3. If the calculated standard deviation ($\sigma$) falls below the first predetermined standard deviation ($SD_1$), the processor 252 may determine that the electronic device 116 is in a state where there is substantially no fluid flow through the electronic device 116, as indicated at step 452. If, however, the calculated standard deviation ($\sigma$) exceeds the first predetermined standard deviation ($SD_1$), the processor 252 may determine that the inlet sensor 120a_i is suitable for use as a control sensor, as indicated at step 454.

The operations set forth in the methods 300 and 400 may be contained as a utility, program, or subprogram, in any desired computer accessible medium. In addition, the methods 300 and 400 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for determining a state of an electronic device positioned in a fluid flow path, said method comprising:
   receiving detected temperatures from an inlet sensor and an outlet sensor positioned in the fluid flow path of the electronic device, wherein the inlet sensor is positioned upstream of the electronic device and wherein the outlet sensor is positioned one of inside and downstream of the electronic device along the fluid flow path;
   determining a change in temperature across the electronic device based upon the temperatures detected by the inlet sensor and the outlet sensor;
   determining whether the change in detected temperature falls below a predetermined low temperature value; and
   determining that the electronic device is operating in a reverse fluid flow path in response to the change in detected temperature falling below the predetermined low temperature difference.

2. The method according to claim 1, further comprising:
   comparing the temperature detected by the outlet sensor with a first predetermined value in response to the change in temperature across the electronic device exceeding the at least one preset condition; and
   wherein determining a state of the electronic device further comprises determining that the outlet sensor is non-operational in response to the detected temperature from the outlet sensor falling below the first predetermined value.

3. A method for determining a state of an inlet sensor positioned to detect temperature at an inlet of an electronic device positioned on an electronics rack, said method comprising:
   detecting a temperature at the inlet of the electronic device using the inlet sensor;
   receiving the detected temperature from the inlet sensor;
   determining whether the detected temperature exceeds at least one preset condition;
   determining a state of the inlet sensor based upon the detected temperature received from the sensor, wherein the state comprises one of a state where the inlet sensor is off calibration, a state where the inlet sensor is detecting re-circulation loads, and a state where the inlet sensor is configured to function as a control sensor;
   determining whether the detected temperature from the inlet sensor exceeds a second predetermined value in response to a determination that the detected temperature from the inlet sensor exceeds the at least one preset condition;
   receiving a detected temperature from another inlet sensor located at a higher level on said electronics rack than the sensor and calculating a difference between the temperature detected by the inlet sensor and the another inlet sensor located at the higher level in response to the detected temperature exceeding the second predetermined value;
   determining whether the difference exceeds a predetermined low temperature difference;
   in response to the difference exceeding the predetermined low temperature difference, comparing the difference with a predetermined temperature variance; and
   wherein determining the state of the inlet sensor further comprises determining that the inlet sensor is off calibration in response to the difference exceeding the predetermined temperature variance.

4. The method according to claim 3, further comprising:
   receiving a detected temperature from an outlet sensor, wherein the inlet sensor and the outlet sensor are located along a common fluid flow path through the electronic device;
   calculating a supply heat index using the temperature detected by the outlet sensor and the inlet sensor in response to the difference falling below the predetermined temperature variance;
   determining whether the supply heat index exceeds a null value; and
   wherein determining the state of the apparatus further comprises determining that the inlet sensor is not suitable to function as a control sensor in response to the supply heat index falling below the null value.

5. The method according to claim 4, further comprising:
   in response to the supply heat index exceeding the null value, comparing the change in detected temperature between the outlet sensor and the inlet sensor with a predetermined high temperature value;
   wherein determining the state of the apparatus further comprises determining that the inlet sensor is not suitable to function as a control sensor in response to the change in detected temperature exceeding the predetermined high temperature value; and
   in response to the change in detected temperature between the outlet sensor and the inlet sensor falling below the predetermined high temperature value, calculating a difference between the temperature detected by the inlet sensor and a source reference temperature.

6. The method according to claim 5, further comprising:
comparing the difference in temperature between the temperature detected by the inlet sensor and the source reference temperature with a third predetermined value; and
wherein determining the state of the apparatus further comprises determining that the inlet sensor is not suitable to function as a control sensor in response to the difference in temperature between the temperature detected by the inlet sensor and the source reference temperature exceeding the third predetermined value.

7. The method according to claim 6, further comprising:
receiving temperatures detected by a plurality of outlet sensors positioned at varying heights with respect to each other along the electronics rack;
in response to the difference in temperature between the temperature detected by the inlet sensor and the source reference temperature falling below the third predetermined value, calculating a standard deviation of the temperatures detected by the plurality of outlet sensors;
comparing the calculated standard deviation with a first predetermined standard deviation; and
wherein determining the state of the apparatus further comprises determining that the inlet sensor is suitable to function as a control sensor in response to the calculated standard deviation exceeding the first predetermined standard deviation.

8. A method for determining a state of an electronic device positioned in a fluid flow path, said method comprising:
receiving detected temperatures from a plurality of sensors, said plurality of sensors comprising an inlet sensor and an outlet sensor positioned in the fluid flow path of the electronic device, wherein the inlet sensor is positioned upstream of the electronic device and wherein the outlet sensor is positioned one of inside and downstream of the electronic device along the fluid flow path;
determining a change in temperature across the electronic device based upon the temperatures detected by the inlet sensor and the outlet sensor;
determining whether the change in detected temperature falls below a predetermined low temperature value; and
in response to the difference between the temperature detected by the inlet sensor and the outlet sensor falling below the predetermined low temperature value, comparing the difference with a null value; and
determining that the electronic device is operating in a reverse fluid flow path in response to the difference falling below the null value.

9. The method according to claim 8, wherein receiving detected temperatures further comprises receiving temperatures detected by a plurality of outlet sensors positioned at varying heights with respect to each other, the method further comprising:
in response to the difference exceeding the null value, calculating a standard deviation of the temperatures detected by the plurality of outlet sensors;
comparing the calculated standard deviation with a second predetermined standard deviation; and
wherein determining the state of the apparatus further comprises determining that the electronic device contains one of a relatively low load and a phantom load in response to the calculated standard deviation falling below the second predetermined standard deviation.

10. The method according to claim 9, further comprising:
receiving input from at least one source, wherein the input indicates at least one of the amount of power consumed by the electronic device and the workload placed on the electronic device; and
determining whether the electronic device has one of a relatively low load and a phantom load based upon the input.

11. The method according to claim 6, further comprising:
receiving temperatures detected by a plurality of outlet sensors positioned at varying heights with respect to each other along the electronics rack;
in response to the difference in temperature between the temperature detected by the inlet sensor and the source reference temperature falling below the third predetermined value, calculating a standard deviation of the temperatures detected by the plurality of outlet sensors;
comparing the calculated standard deviation with a first predetermined standard deviation; and
wherein determining the state of the apparatus further comprises determining that there is substantially no flow across the electronic device in response to the calculated standard deviation falling below the first predetermined standard deviation.

12. The method according to claim 8, wherein receiving detected temperatures further comprises receiving temperatures detected by a plurality of outlet sensors positioned at varying heights with respect to each other, the method further comprising:
in response to the difference exceeding the null value, calculating a standard deviation of the temperatures detected by the plurality of outlet sensors;
comparing the calculated standard deviation with a second predetermined standard deviation; and
determining that there is substantially no flow across the electronic device in response to the calculated standard deviation exceeding the second predetermined standard deviation.

* * * * *